Nov. 20, 1962  R. A. DEIBEL ETAL  3,064,752
DOOR LOCKING SYSTEM FOR MOTOR VEHICLES
Filed Aug. 27, 1958
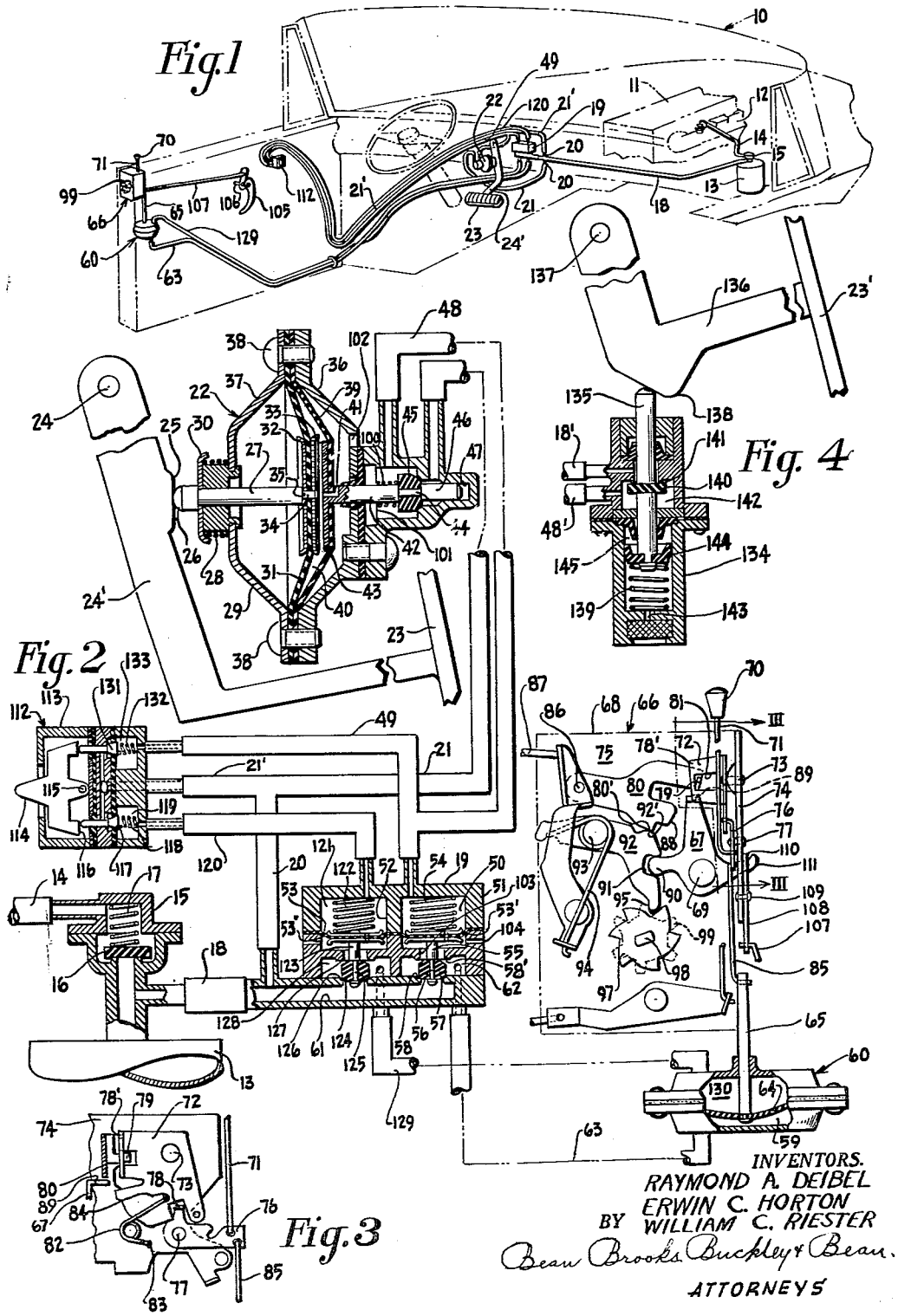
INVENTORS.
RAYMOND A. DEIBEL
ERWIN C. HORTON
WILLIAM C. RIESTER
BY Bean Brooks Buckley & Bean.
ATTORNEYS

United States Patent Office 3,064,752
Patented Nov. 20, 1962

3,064,752
DOOR LOCKING SYSTEM FOR MOTOR VEHICLES
Raymond A. Deibel, Cheektowaga, Erwin C. Horton, Hamburg, and William C. Riester, Williamsville, N.Y., assignors to Trico Products Corporation, Buffalo, N.Y.
Filed Aug. 27, 1958, Ser. No. 757,567
6 Claims. (Cl. 180—82)

This invention relates to an improved automatic locking system for a vehicle and more particularly to a system which will cause automatic locking of the vehicle doors incidental to the normal operation of the vehicle to thereby maintain the vehicle doors locked against unauthorized intrusion.

It is one object of the present invention to provide an improved automatic locking system for a vehicle which will cause locking of the doors incidental to the normal operation of the vehicle without any requirement for deliberate action on the part of the vehicle operator and which will maintain the doors of the vehicle in a locked condition until they are manually unlocked by the vehicle operator or another person within the vehicle.

Another object of the present invention is to provide an automatic locking system for a vehicle which, in addition to the foregoing, permits either direct unlocking of the vehicle doors from within the vehicle or remote unlocking of the vehicle doors, as by the operator in the instance of admitting a passenger into the vehicle, without interference from the automatic locking system, even when the control for actuating the door locks to a locked condition is actuated.

A further object of the present invention is to provide an improved arrangement for preventing the operation of the automatic locking system from locking the vehicle operator out of the vehicle when it is left unattended. In accordance with this object, the same component of the vehicle which actuates the automatic locking arrangement also precludes actuation thereof when the vehicle is unoccupied, thereby obviating the necessity for additional control structure.

Yet another object of the present invention is to provide an improved fluid pressure self-return switching arrangement which produces a predetermined response when actuated but automatically returns to a neutral position while it still remains in an actuated condition.

A still further object of the present invention is to provide an improved system for locking the doors of a vehicle which is simple in construction, efficient in operation, and economical to manufacture. Other objects and attendant advantages of the present invention will readily be perceived hereafter.

The present invention relates to an improved system including a control for automatically locking vehicle doors against intrusion in response to the normal operation of the vehicle and for permitting either direct unlocking of the vehicle doors from within the vehicle or remote unlocking of the vehicle doors from the operator's position even though the control for causing automatic locking is actuated. In accordance with the present invention, latch locks are provided for the vehicle doors and motor means are operatively associated therewith. The selective actuation of the control to cause the motor means to place the door locks in a locked condition occurs in response to the actuation of the brake pedal of the vehicle. Whenever the vehicle is in operation the brakes must of necessity be operated prior to bringing the vehicle to a stop. This action causes the control to effect automatic locking of the vehicle doors to prevent unauthorized entry into the vehicle when it comes to a standstill. The lock itself is of such construction that once actuated to a locked condition it remains in this locked condition until it is manually actuated to an unlocked condition. Thus, once the brake pedal has been actuated, the doors remain locked against opening from outside of the vehicle regardless of any subsequent operational condition of the vehicle, including the instance where the vehicle is stopped with the engine turned off. In addition to the protection against unauthorized intrusion, the present system requires only that those doors which have been opened after the operator has taken his foot off of the brake pedal be manually relocked, and therefore the system provides the added convenience of only requiring that certain of the vehicle doors be locked from the outside when the vehicle is parked. Furthermore, the control is of such a nature that once it has actuated the door latch locks to a locked condition, it automatically terminates the communication between the door locking motors and an energy source therefor to permit either direct unlocking of the vehicle doors from within the vehicle, or remote unlocking of the vehicle doors from the operator's position without interference from the door locking motors, notwithstanding that the brake system may still be in the same condition in which it initiated the locking of the vehicle doors.

The present invention is particularly advantageous in a vehicle having an automatic transmission. Ordinarily the operator of such a vehicle steps on the brake pedal during the starting of the engine. Thus when the automatic door locking system of the present invention is installed in such a vehicle, the doors are automatically locked prior to the actual placing of the vehicle in motion.

It will be appreciated that since the brake system must be actuated in order to lock the latch locks, the leaving of the vehicle by the vehicle operator will cause a return of the brake pedal to a position wherein automatic locking of the vehicle doors cannot be effected, and thereby the same element of the vehicle, in this instance the brake system, which initiates the automatic locking, also precludes operation of the automatic locking system to prevent the vehicle operator from being locked out of the vehicle when it is left unattended. The present invention will be more fully understood when the following portions of the specification are read in conjunction with the accompanying drawings wherein:

FIG. 1 is a fragmentary perspective view of an automotive vehicle containing the automatic locking system of the present invention;

FIG. 2 is an enlarged diagrammatic view, partly in cross section, of the salient components of the door locking system;

FIG. 3 is a view of the latch-lock structure taken along line III—III of FIG. 2; and FIG. 4 is a modified embodiment of control valve structure which may be utilized in the system of FIG. 2.

The door locking system is installed in the vehicle 10 (FIG. 1) having an engine 11 with the usual intake manifold 12. As can be seen from FIGS. 1 and 2, a vacuum tank 13 is coupled to manifold 12 by conduit 14. A check valve 15 including valve element 16 and biasing spring 17 is interposed between conduit 14 and vacuum tank 13. As is well known in thet art, vacuum tank 13 will be evacuated during periods of high manifold vacuum and this vacuum will be retained within the tank due to the conventional operation of check valve 15 during periods of low manifold vacuum.

The present invention causes automatic locking of the vehicle doors after the vehicle has been placed in operation in order to safeguard the occupants of the vehicle against unauthorized intrusion without any requirement for deliberative effort on the part of the vehicle operator. To this end, a conduit 18 is coupled between vacuum tank 13 and a distributor valve 19, which may be mounted at any convenient location on the vehicle. Conduit 18 is also coupled through conduits 20 and 21 to control valve 22 which actuates the door locks to a locked condition in response to the normal operation of the vehicle, as described in detail hereafter.

After the vehicle has been placed in operation, the brakes, which are a normal vehicle part, must of necessity be applied prior to the bringing of the vehicle to a stop. When the brake pedal 23, which constitutes a normally inactive periodically operated component, is depressed for the purpose of slowing the movement of the vehicle, lever 24' pivots about pin 24 in a clockwise direction (FIG. 2), and contact will be lost between portion 25 of lever 24' and head portion 26 of control valve stem 27. After this occurs, spring 28 which is interposed between valve body 29 and dished washer 30, which is rigidly mounted on stem 27, will cause stem 27 to move to the left in FIG. 2. The end of stem 27 which is remote from head portion 26 is affixed to diaphragm 31 by means of dished washers 32 and 33 which straddle diaphragm 31 and which are mounted on the reduced diameter portion 34 of stem 27, the dished washers being retained in position by shoulder 35 on stem 27 and the peened head (not numbered) of the reduced diameter portion 34. The movement of stem 27 to the left in FIG. 2 under the influence of spring 28 will cause a corresponding movement of diaphragm 31 to the left because of the above described connections.

It will be noted that diaphragm 31 is held between sections 36 and 37 of housing 22, as by rivets 38. Also held between housing sections 36 and 37 in the same manner is a follower diaphragm 39. A suitable vent (not shown) is located in housing section 37 for permitting unrestricted movement of diaphragm 31. A chamber 40 exists between diaphragms 31 and 39, and it is to be noted that there is no mechanical connection between these diaphragms other than their points of affixation between the housing sections 36 and 37.

When diaphragm 31 moves to the left in the above described manner, diaphragm 39 will move to the left also because an area of reduced pressure will be created within chamber 40, notwithstanding that air may enter chamber 40 through metering conduit 41, as described hereafter. The movement of follower diaphragm 39 to the left will cause a movement of stem 42 to the left also, stem 42 having an enlarged T-head portion 43 abutting the side of diaphragm 39 which lies within chamber 40. Affixed on the reduced diameter portion 44 of stem 42 is a poppet valve 45 which is adapted to seat on a mating valve seat (not numbered) when diaphragm 39 is in the position shown in the drawing. A guide extension 46 of stem 42 is adapted to move in a mating bore 47 within the valve housing.

As noted above, when diaphragm 39 moves to the left because of the actuation of diaphragm 31, valve 45 will me unseated to thereby permit communication between conduit 21 and conduit 48 which is in communication with conduit 49, which in turn communicates with chamber 50 of distributor valve 19. Thus, when the brake pedal 23 is depressed, there will be communication between vacuum tank 13 and chamber 50 of distributor valve 19 through control valve 22.

Distributor valve 19 consists of a housing 51 which is divided into two chambers by partition 52. These chambers are in turn divided by diaphragm 53, consisting of diaphragm sections 53' and 53", which extends through the valve body 51 in a horizontal direction. Located within the above mentioned chamber 50 is a spring 54 which biases diaphragm section 53' downwardly. Suitably affixed, as by dished washers (not numbered), to diaphragm section 53' is a shaft 55, and affixed to a reduced diameter portion 56 of shaft 55 is a poppet valve 57.

When vacuum communicates with chamber 50 of distributor valve 19 in the above described manner, poppet valve 57 will be raised from its seat 58 and be placed on its seat 58'. The raising of valve 57 from its seat 58 will permit vacuum tank 13 to communicate with chamber 59 of fluid pressure motor 60 through conduit 18, conduit 61 forming a part of distributor valve 19, chamber 62 of valve 19, and conduit 63 which is in communication with both chamber 62 and chamber 59. This, in turn, will cause diaphragm 64 within fluid pressure motor 60 to be pulled downwardly and in turn cause shaft 65, which is suitably affixed thereto, to actuate latch-lock 66 to a locked condition.

Latch lock 66 operates in the following manner: A bell crank lever 67 is pivotally mounted on housing 68 by pin 69. The conventional manual door locking and unlocking pin 70 having a shaft 71 extends through the molding (not shown) of the vehicle door to pivot link 72 (FIGURES 2 and 3) about pin 73 which extends from flange 74 positioned at right angles to plate 75 of housing 68. A bell crank lever 76 is adapted to move about its pivot 77, one leg of lever 76 being affixed to shaft 71 and the other leg thereof fitting within notched recess 78 within link 72. As can be seen from FIG. 3 when shaft 71 is depressed, link 76 will pivot in a clockwise direction and link 72 will move in a counter clockwise direction about its pivot pin 73 and thereby cause the portion 78' of link 72 to move downwardly and carry prong 79 of lever 80 (FIG. 2) downwardly with it, prong 79 fitting within the slotted portion 81 of link 72 (FIG. 2). It will be noted that a snap spring 82 has the end 83 thereof anchored on flange 74 and the other end 84 thereof anchored on link 72. Thus, when manual locking pin 70 is depressed to a locked condition, it is the snap spring 82 which maintains link 72 in a locked position.

Shaft 65 of fluid pressure motor 60 is coupled to shaft 85 (FIGURES 2 and 3), which is, in turn, coupled to bell crank lever 76. Thus the downward movement of shaft 65 in response to the existence of vacuum in chamber 59 of fluid pressure motor 60 will cause a downward movement of shaft 85 which, in turn, will cause a downward movement of the leg of bell crank lever 76 to which shaft 85 is attached to thereby place link 72 in the position shown in FIGURES 2 and 3.

After link 80 has been pivoted in a clockwise direction about pin 86 in the above described manner, the movement of pin 87 to the right as occurs when the outside door handle (not shown) is manipulated will cause link 80 to move to the right in FIG. 2. However, the end 88 of link 80 will not contact flange 89 of bell crank lever 67. Thereby the manipulation of the outside door handle will be ineffective for unlocking the door lock.

It is only when link 80 has been pivoted about pin 86 in a counter clockwise direction so that the end 88 thereof may abut flange 89 when the outside door handle is manipulated, that the vehicle door may be opened from the outside. When end 88 of link 80 abuts flange 89 of bell crank lever 67 in response to the movement of pin 87 to the right during a door opening operation, lever 67 will pivot clockwise about pin 69 and the leg 90 of lever 67 which is within the recessed portion 91 of lever 92 will cause the latter to pivot in a counter clockwise direction about its pivot pin 93 against the bias of spring 94. This in turn will cause the tongue 95 to cease engagement with ratchet wheel 97, which is, in turn, coaxially mounted on shaft 98 with the rotary door latch 99. When this locking arrangement for the rotary door latch 99 is released, it is free to move relative to the striker plate (not shown) on the door jamb to permit the vehicle door to be pulled to an open position.

As described in detail above, it can readily be seen that when the brake pedal is depressed, there will be communication of vacuum to chamber 59 of fluid pressure motor 60 to effect a door locking operation automatically in response to an act performed during the normal operation of the vehicle. However, it will readily be appreciated that the vehicle operator may retain contact with the brake pedal 23 while the vehicle is at a standstill and that a passenger may desire to alight from the vehicle while the brake pedal is depressed. In order to permit this type of operation, it will be noted that the control valve 22 automatically returns to a position where it terminates communication between the vacuum tank 13 and chamber 59 of motor 60 to permit the manipulation of the inside door handle to open the vehicle door. More specifically, after diaphragm 39 of valve 22 has followed diaphragm 31 to the left to open valve 45 to cause the above described automatic door locking, spring 100, which is interposed between valve 45 and shoulder 101 within the valve, will cause stem 42 and valve 45 carried thereon to move to the right at a controlled rate because the air outside of valve body 29 flows into chamber 40 between diaphragms 39 and 31 through vent 102 and then through metering conduit 41 in shaft 42 at a controlled rate. It can readily be seen that notwithstanding the maintaining of diaphragm 31 in its position to the left, diaphragm 39 will return to its position shown in the drawing under the influence of spring 100 and thereby cause valve 45 to seat itself to disrupt the communication between vacuum tank 13 and chamber 50 of distributor 19. After this communication is terminated, spring 54 within chamber 50 will cause diaphragm 53' to move downwardly which, in turn, will cause poppet valve 57 to be moved off of its seat 58' and on to its seat 58 to disrupt communication between vacuum tank 13 and chamber 59 of fluid pressure rotor 60. After valve 57 has returned to the position shown on FIG. 2, chamber 59 of fluid pressure motor 60 may communicate with the atmosphere through conduit 63, chamber 62 of valve 19, and apertures 103 and 104, the latter being positioned in the valve housing. The venting of chamber 59 of motor 60 to the atmosphere in the above described manner will permit the door latch lock 66 to be moved to an unlocked position by the manipulation of lever 70 or door handle 105 without interference from door lock actuating motor 60, notwithstanding that the brake pedal may be depressed. It will be understood that resilient diaphragm 64 of motor 60 is in a downwardly bowed position shown in FIG. 2 when latch lock 66 is in a locked condition because the over-center spring 82 in FIG. 3 maintains shaft 65 in its lowermost position when the door is locked.

When the inside door handle 105 (FIG. 1) is pivoted in a clockwise direction about pin 106, link 107 will be caused to move to the right. As can be seen from FIG. 2, link 107 is connected to lever 108 which is, in turn, pivotally mounted to flange 74, as by rivet 109. The upper end 110 of lever 108 extends across lip 111 of bell crank lever 67 so that the movement of link 107 as described above will cause end 110 of lever 108 to move into the plane of the drawing about pivot pin 109 and thereby cause lip 111 of lever 67 to move downwardly with the attendant result of causing lip 95 of lever 92 to move out of engagement with ratchet wheel 97 to permit the door to be opened.

As described above, the unlocking of the vehicle doors may be effected by means of manual unlocking pin 70 or door handle 105 whether or not brake pedal 23 is depressed. However, many times the vehicle operator may desire to unlock a vehicle door without the inconvenience of reaching over to perform this feat manually. To this end a remote control is provided within the vehicle. This control consists of a manual valve 112 (FIGURES 1 and 2). Valve 112 consists of a housing 113 having a lever 114 pivotally mounted thereon by pin 115. When it is desired to unlock the doors from a remote position, lever 114 is pivoted in a counter clockwise direction whereby the end 116 thereof depresses valve 117 against the bias of spring 118. This will permit the vacuum to be communicated from tank 13 through conduits 18, 20 and 21', chamber 119 of valve 112 and conduit 120 to chamber 121 of distributor valve 19. This in turn will cause diaphragm 53 to be raised against the bias of spring 122 and thereby cause shaft 123 affixed to diaphragm 53'' to move upwardly and move valve 124, which is mounted on the reduced diameter portion 125 of shaft 123, from its seat 126 to its seat 127. The movement of valve 124 from its seat 126 will cause vacuum to communicate from tank 13 through conduit 18, conduit 61 in valve 19, chamber 128 of valve 19 and conduit 129 to chamber 130 of motor 60. The existence of vacuum within chamber 130 will cause flexible diaphragm 64 to deflect upwardly and thereby carry shaft 65 upwardly also, which in turn will cause shaft 85 to move bell crank lever 76 (FIG. 3) in a counter clockwise direction about pivot pin 77 to cause link 72 to move to a position whereby it places latch lock 66 in an unlocked condition, as described in detail above. When latch lock 66 is placed in the above condition, the vehicle door may be opened from the outside by manipulating the door handle (not shown) which, in turn, causes pin 87 to move to the right to thereby cause the end 88 of link 80 to abut flange 89 to effect an unlocking of the vehicle door.

If, for any reason, it is desired to lock all of the doors from a remote position without relying on the automatic locking arrangement to operate through control valve 22, it is merely necessary to manipulate lever 114 of valve 112 in a clockwise direction to cause valve 131 therein to unseat against the bias of spring 132. This will permit vacuum to communicate from tank 13 through conduits 18, 20 and 21', chamber 133 of valve 113, and conduit 49 to chamber 50 of distributor valve 19, whereupon the above described sequence in distributor valve 19 encountered during an automatic door locking operation is repeated to place latch locks in a locked condition in response to the manual actuation of valve 112. When lever 114 of valve 112 is released, the spring 132 will return it to a neutral position and distributor valve 19 will, in turn, return to the condition shown in FIG. 2.

It will thus be seen that an automatic locking system for a vehicle has been described which is operative to mainntain the doors of a vehicle locked without interfering with the unlocking of these doors from within the vehicle. It will further be appreciated that prior to leaving a vehicle, the operator must first remove his foot from brake pedal 23 thereby returning control valve 22 to the position shown in FIG. 2. The subsequent opening of the vehicle door by the use of inside door handle 105 will cause the lock to return to an unlocked condition because the portion 92' of lever 92 in moving upwardly when the door handle is manipulated will abut the portion 80' of link 80 and cause the latter to move upwardly whereby the subsequent manipulation of the outside door handle with the resultant moving to the right of pin 87 will cause end 88 of link 80 to abut flange 89 of bell crank lever 67 to enable opening of the door from outside of the vehicle. It will readily be appreciated that since the brake lever 24' maintains control valve 22 in the position shown in FIG. 2 when the vehicle operator is not within the vehicle, there can be no supplying of fluid pressure to chamber 59 of motor 60 to cause an automatic locking of the vehicle doors. Thus, the same element or component of the vehicle, namely the brake lever 24' which initiates operation of the automatic locking system incidental to the normal operation of the vehicle also effectively acts as an interlock to preclude automatic locking of the vehicle doors when the vehicle is left unattended.

An alternate embodiment of the control valve 22 for actuating the motors of the door locking system is shown in FIG. 4. This control valve consists of a housing 134 in which is reciprocably mounted a stem 135. When the brake pedal 23' is depressed lever 136 will pivot in a clockwise direction about pivot pin 137. The under side of lever 136 is in the nature of a cam having a high point at 138. As lever 136 pivots in a clockwise direction, the high point 138 will wipe across stem 135 and depress it against the bias of spring 139. When stem 135 is depressed, valve 140, which is rigidly mounted thereon, will be moved away from its seat 141 to permit communication between conduit 18', which is coupled to a vacuum tank (not shown), and conduit 48' through valve chamber 142. Conduit 48' is adapted to be coupled to distributor valve 19 and communicate with chamber 50 therein. Thus, when the high point 138 of the cam surface of lever 136 establishes the foregoing communication, vacuum will be supplied to chamber 50 of distributor valve 19 to thereby establish the above described sequence of events described in detail above relative to FIG. 2 whereby motor 60 actuates latch lock 66 to a locked condition.

It will be noted that valve 134 has a dashpot type of action whereby there is a time delay between the movement of stem 135 to its lowermost position under the influence of high point 138 and the return thereof to its uppermost position because of the biasing action of spring 139. This time delay occurs because of the metering action produced by orifice 143, in the valve body, which controls the return of atmospheric air into the chamber in which spring 139 is located. Furthermore, it will be noted that piston 144, which is rigidly mounted on the end of stem 135, is of the type which will readily permit air to pass from the chamber in which spring 139 is located to the chamber 145 when stem 135 is moved downwardly, but will impede the flow of air between these chambers in the reverse direction when stem 135 is moved upwardly. This action is obtainable because of the inverted frusto-conical shape of piston 144 with the larger base portion thereof only in contact with the internal walls of the chamber in which the piston rides, the upper side of the piston being open to the atmosphere as through a vent (not shown).

When the brake pedal 23' is in its fully depressed condition, the high point 138 will no longer be depressing valve stem 135 whereby stem 135 may return to its uppermost position shown on the drawing. Thus, notwithstanding that the brake pedal 23' may be fully depressed, the parts within valve housing 134 will return to the position shown in FIG. 4 to prevent communication between conduits 18' and 48', whereby the chamber 59 of motor 60 will communicate with the atmosphere through conduit 63 chamber 62 of valve 19 and apertures 103 and 104 in valve 19 to thereby permit the door latch locks to be manually actuated to an open position notwithstanding that the brake pedal is fully depressed.

In the embodiment of FIG. 4 it will further be appreciated that after personnel have entered the vehicle and the operator takes his foot off of pedal 23', the latter will return to its position shown in the drawing, and in so doing the high point 138 of lever 136 will again wipe across stem 135 to initiate the above described sequence of actions in valve 140, whereby the door locks will immediately be placed in a locked condition before the vehicle is even in motion.

It is to be noted at this point that reference has been made above to manual locking and unlocking of the vehicle doors. It is to be understood that this terminology includes both direct actuation of the doors, as by manual unlocking pin 70 and door handle 105, and remote unlocking of the doors by the use of switch 112.

It is to be further understood that while the present invention has been described as being vacuum operated, it may also be operated from a source of fluid pressure, either pneumatic or hydraulic, after suitable modifications have been made.

While the above description has been relative to one door and one door lock therein for ease of explanation, it will be understood that a vehicle having the usual plurality of doors will have similar locks and motors therein with analogous conduits linking the door locking motors to the distributor valve 19.

While preferred embodiments of the present invention have been disclosed, it is to be understood that the present invention may be otherwise embodied within the scope of the following plans.

What is claimed is:

1. A system for automatically locking the door of a vehicle comprising a door in said vehicle, a lock operatively associated with said door, a source of energy in said vehicle, a normal vehicle part in said vehicle which is normally inactive but is adapted to be periodically actuated during normal operation of said vehicle, motor means for actuating said lock, first unlocking means within said vehicle for unlocking said lock, means normally preventing communication between said energy source and said motor means but being responsive to the actuation of said normal vehicle part for placing said motor means in communication with said energy source to thereby place said lock in a locked condition, and means for automatically returning said means for placing or preventing said communication to a position which will terminate said communication between said energy source and said motor means while said normal vehicle part remains in the position which originally caused said communication thereby preventing said motor means from interfering with unlocking of said lock by the use of said first unlocking means while said normal vehicle part remains actuated.

2. A system for automatically locking the door of a vehicle comprising a door in said vehicle, a lock operatively associated with said door, means for maintaining said lock in a locked condition until it is manually actuated to an unlocked condition, lock unlocking means within said vehicle, motor means for actuating said lock, a source of energy, a brake system in said vehicle, control means actuable by said brake system for causing said motor means to communicate with said energy source to effect an automatic locking of said vehicle door incidental to the actuation of said brake system, and means associated with said control means for terminating said communication between said energy source and said motor means while said brake system remains actuated to permit said door to be manually unlocked from within the vehicle by the use of said lock unlocking means without interference from said motor means while said control means are actuated.

3. A self return valve for providing selective communication between a door locking motor and an energy source and then automatically terminating such communication notwithstanding that the impetus which initiated such communication is still in effect comprising a housing, a first diaphragm in said housing, motion inducing means operatively associated with said first diaphragm for causing said first diaphragm to move from a normal deactuated position, a second diaphragm in said housing, spring means for biasing said second diaphragm to a predetermined position, a chamber located between said first and second diaphragms for causing said second diaphragm to follow said first diaphragm against the bias of said spring means when said first diaphragm is actuated from its normal position, metering means operatively associated with said chamber, said spring means in conjunction with said metering means causing said second diaphragm to return to said predetermined position notwithstanding that said first diaphragm remains away from its normal position.

4. A system for automatically locking the door of a vehicle comprising a door in said vehicle, a latch lock operatively associated with said door, motor means operatively coupled to said latch lock, first means on the inside of said vehicle for actuating said latch lock to a locked or unlocked condition, second means on the outside of the vehicle for unlatching said latch lock when said latch lock is unlocked, means associated with said latch lock for maintaining said latch lock in a locked condition until it is manually actuated to an unlocked condition, said second means being incapable of unlocking said latch lock when said means maintain said latch lock in a locked condition thereby preventing opening of said vehicle door by the use of said second means when said latch lock is locked, a normally inactive operating component in said vehicle which is repeatedly actuated incidental to the normal operation of said vehicle, an energy source in said vehicle, control means actuable by said operating component for causing said motor means to repeatedly communicate with said energy source to thereby actuate said motor means to place said latch lock in a locked condition, and means operatively associated with said control means for terminating said communication notwithstanding that said operating component remains in the position in which it normally causes said control means to cause said communication whereby said motor means no longer exerts a door locking force on said latch lock to thereby permit said latch lock to be unlocked by the use of said first means, said means for maintaining said lock in a locked condition until it is manually actuated preventing unlocking of said latch lock by said second means whereby egress from the vehicle by vehicle occupants is permitted regardless of the condition of said operating component and whereby unauthorized intrusion by the use of said second means to unlatch said latch lock from outside of said vehicle is prevented.

5. A system as set forth in claim 4 wherein said energy source is a source of fluid pressure and wherein said motor means is a fluid pressure motor and wherein said operating component which is normally inactive but is repeatedly actuated is the brake pedal of the vehicle.

6. A self-return valve for providing selective communication between a door locking motor and an energy source and then automatically terminating such communication notwithstanding that the impetus which initiated such communication is still in effect comprising a first housing portion, a second housing portion, first and second diaphragms secured between said housing portions, said first diaphragm being secured to said first housing portion, said second diaphragm being secured to said second housing portion, said first and second diaphragms defining a chamber, metering means associated with said chamber for permitting air to be metered into said chamber, first means fastened to said first diaphragm for moving said first diaphragm from its normal inactive position and in a predetermined direction in response to an impetus, said metering means being of a size to cause said first and second diaphragms to move in unison in response to said impetus, second means coupled to said second diaphragm for causing said communication between said door locking motor and said energy source when said second diaphragm moves with said first diaphragm, and means for biasing said second diaphragm in a direction opposite to said predetermined direction of movement of said first diaphragm when it receives said impetus whereby said second diaphragm and said second means return to a position wherein said communication is terminated as a result of the metering of air through said metering means whereby said communication between said energy source and said door locking motor is disrupted notwithstanding that the impetus which originated such communiaction is still in effect.

References Cited in the file of this patent

UNITED STATES PATENTS

| 18,550 | McGahn | Nov. 3, 1857 |
| 2,198,862 | Chesler | Apr. 30, 1940 |
| 2,804,159 | Gavito | Aug. 27, 1957 |
| 2,815,085 | Whipple | Dec. 3, 1957 |

FOREIGN PATENTS

| 16,192 | Australia | Oct. 22, 1929 |
| 121,357 | Germany | June 19, 1901 |
| 12,217 of 1884 | Great Britain | Sept. 9, 1884 |